UNITED STATES PATENT OFFICE.

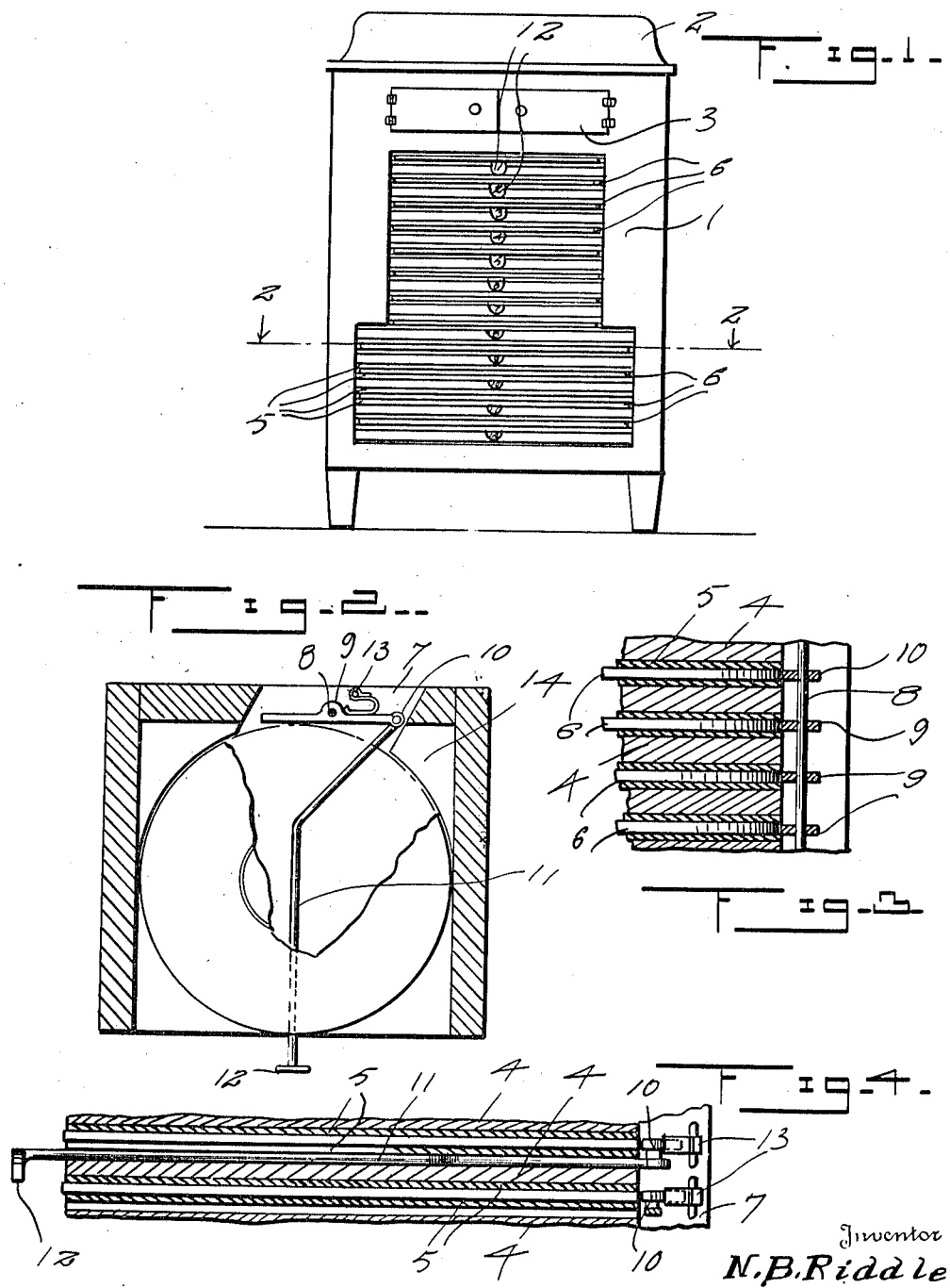

NAPOLEON B. RIDDLE, OF WILSON, LOUISIANA.

RECORD-EJECTOR FOR TALKING-MACHINES.

1,309,656.  Specification of Letters Patent.  Patented July 15, 1919.

Application filed March 1, 1918. Serial No. 219,810.

*To all whom it may concern:*

Be it known that I, NAPOLEON B. RIDDLE, a citizen of the United States, residing at Wilson, in the parish of East Feliciana and State of Louisiana, have invented certain new and useful Improvements in Record-Ejectors for Talking-Machines; and I do hereby declare the following to be a full, clear, and exact description of the invention, such as will enable others skilled in the art to which it appertains to make and use the same.

This invention relates to a record ejector for talking machine cabinets and has for one of its objects the provision of a device of this character, whereby any one of the records contained within the cabinet of a talking machine may be ejected therefrom when desired.

Another object of this invention is the provision of a plurality of shelves relatively spaced for receiving the records and which will support said records in a horizontal plane to prevent them from warping.

A further object of this invention is the provision of suitable fabric, such as plush or the like secured to the faces of the shelves for the purpose of engaging the records whereby the records will be cleaned upon insertion and withdrawal from the shelves and which will prevent the records from becoming scratched or injured.

A further object of this invention is the provision of an ejecting member to each of the shelves adapted to be operated by an actuating lever for ejecting any one of the records from the shelves.

A still further object of this invention is the provision of a record ejector for talking machine cabinets of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:

Figure 1 is a front elevation of a talking machine cabinet having a record ejector constructed in accordance with my invention.

Fig. 2 is a sectional view taken on the line 2—2 of Fig. 1,

Fig. 3 is a detail sectional view illustrating the means for pivoting the ejecting members within the cabinet, Fig. 4 is a fragmentary longitudinal sectional view illustrating one of the actuating rods for operating the ejecting members.

Referring in detail to the drawings, the numeral 1 indicates a cabinet of a talking machine having the usual removable lid 2 for exposing the operating parts of the machine, (not shown). The cabinet 1 is provided with the usual doors 3 for permitting the sounds of the talking machine to escape from the cabinet. The front wall of the cabinet 1 is provided with an opening in which is mounted, a plurality of horizontally disposed shelves 4, which are arranged in pairs and have secured to their adjoining or opposing faces, cushioning material 5, such as felt or like material suitable for the purpose, and is adapted to engage or receive a record as shown at 6. Upon inserting the records between the shelves, the fabric or cushioning material 5 will remove all dirt and foreign matter therefrom and will prevent the records from becoming scratched or injured while stored within the cabinet.

The records are also supported in horizontal planes and will be prevented from becoming warped, which is customary in some instances where the records are stored within the cabinet in a vertical plane.

The rear wall of the cabinet 1 is provided with an opening 7, in which is disposed a vertical rod 8, on which is journaled a plurality of record ejecting members 9 that have pivoted thereto, as shown at 10, a plurality of actuating rods 11.

One shelf of each of the pairs is provided with a groove to slidably receive the actuating rods 11, which have their free ends disposed exteriorly of the front wall of the cabinet 1 as clearly shown in Figs. 1 and 2. The actuating rods 11 have formed upon their free ends, buttons or finger grips 12, on which may be applied, numbers corresponding with the numbers upon the records, whereby upon pushing upon a certain button or finger grip, the corresponding record bearing the number upon the respective button or finger grip will be partially ejected from the cabinet 1, owing to the actuating rod rocking the ejecting member upon its pivot.

Springs 13 are secured to the cabinet 1 and engage the ejecting members 9 for normally holding said members in an inoperative position and which will automatically return said members to an inoperative position upon releasing the actuating rods 11.

Suitable blocks 14 are positioned within the cabinet and coöperate with the shelves in limiting the inward movement of the disks or records within the cabinet. The front wall of the cabinet is so formed that the upper portion will receive records of the ten-inch size, while the lower portion will receive records of the twelve-inch size, as clearly shown in Fig. 1.

While I have shown and described the preferred embodiment of my invention, it will be understood that minor changes in construction, combination and arrangement of parts may be made without departing from the spirit and scope of the invention as claimed.

Having thus described my invention, what I claim is:

A record ejector including a cabinet having its front open and a vertical slot in its rear wall, pairs of spaced shelves secured in the cabinet and one shelf of each pair having a groove in one of its faces, padding secured to the opposing faces of said shelves to engage the faces of records, a vertical rod located in the slot and secured to the cabinet, spring pressed ejecting members journaled on said rod, and rods slidable in said grooves and pivoted to one end of the ejecting members and having their other ends disposed outwardly of the front of said cabinet.

In testimony whereof I affix my signature in presence of two witnesses.

NAPOLEON B. RIDDLE.

Witnesses:
 Dr. W. L. Singleton,
 A. J. Brignac.